Nov. 8, 1932.  E. A. NELSON  1,887,378
WHEEL AND WRENCH THEREFOR
Original Filed June 6, 1930  2 Sheets-Sheet 1
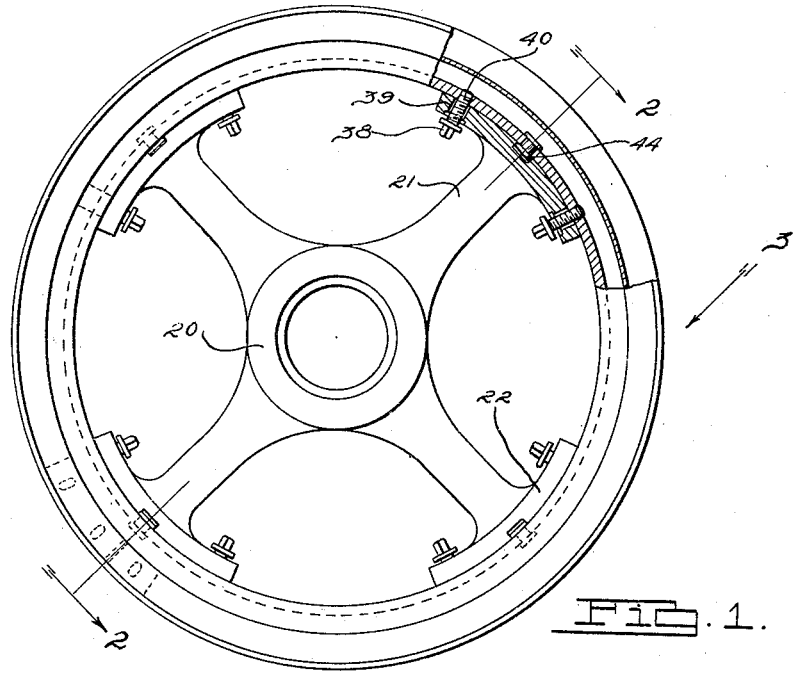
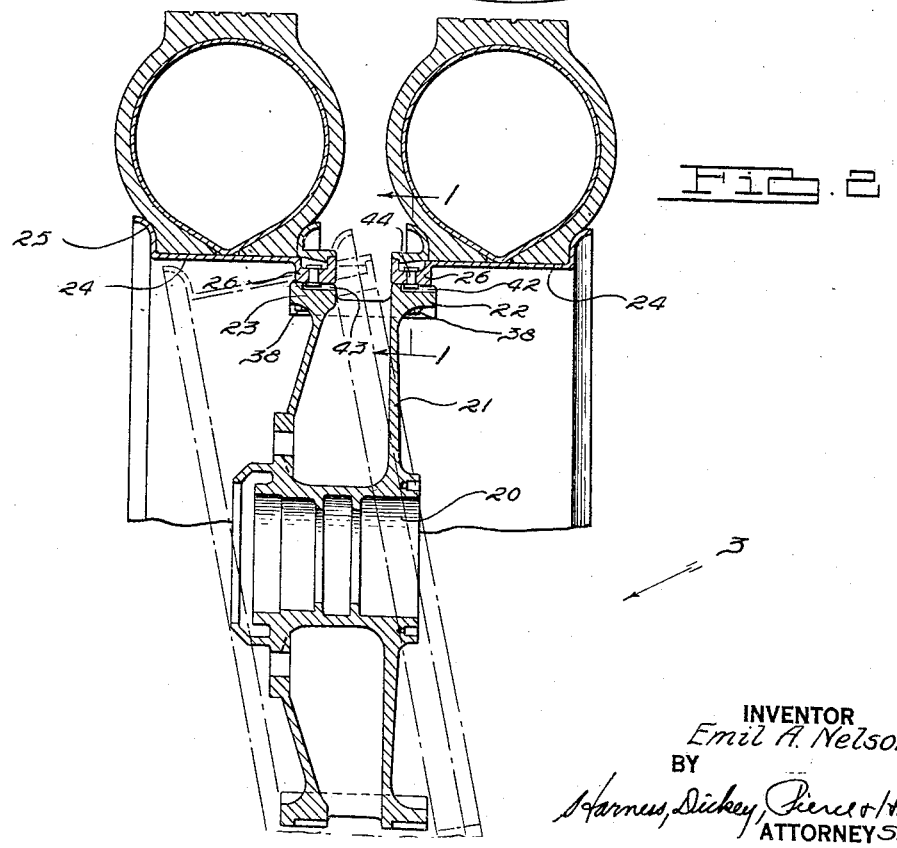
INVENTOR
Emil A. Nelson.
BY
ATTORNEYS.

Nov. 8, 1932.   E. A. NELSON   1,887,378
WHEEL AND WRENCH THEREFOR
Original Filed June 6 1930    2 Sheets-Sheet 2
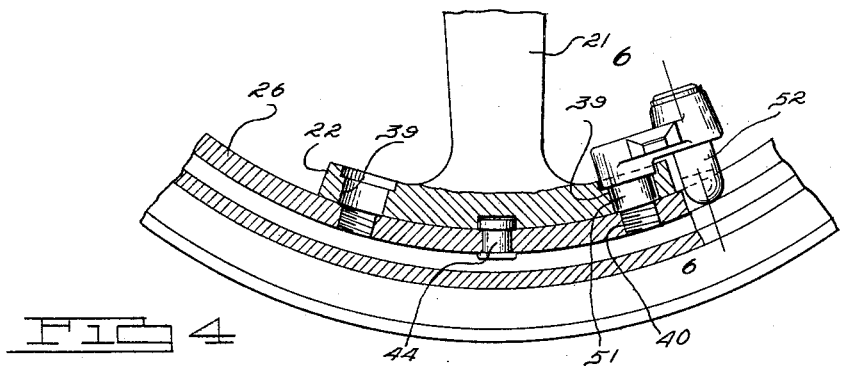
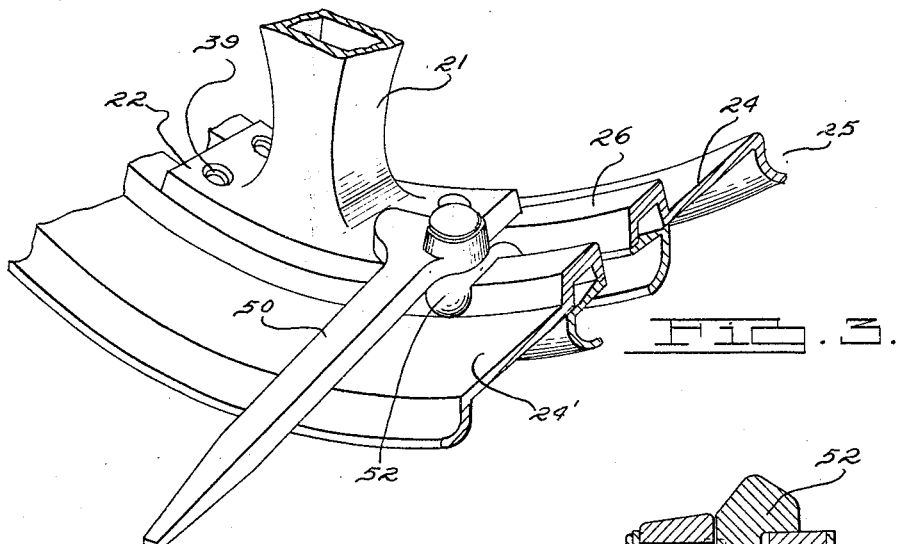
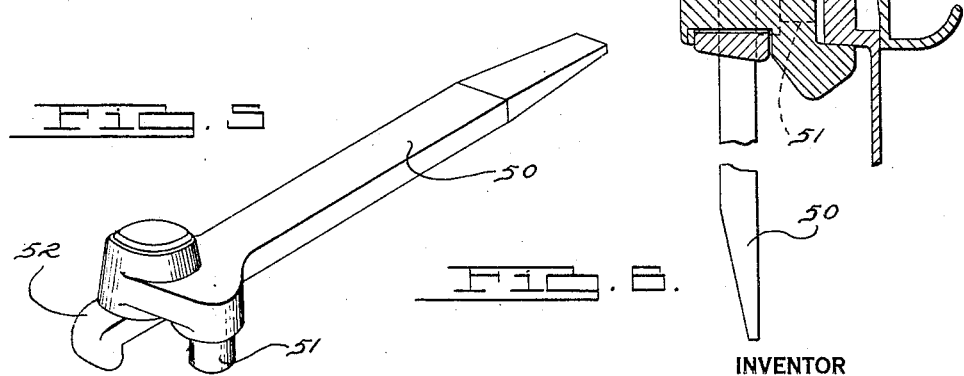
INVENTOR
*Emil A. Nelson.*
BY
*Harness, Dickey, Pierce & Hann*
ATTORNEYS.

Patented Nov. 8, 1932

1,887,378

UNITED STATES PATENT OFFICE

EMIL A. NELSON, OF ST. CLAIR SHORES, MICHIGAN

WHEEL AND WRENCH THEREFOR

Application filed June 6, 1930, Serial No. 459,600. Renewed August 25, 1932.

A dual wheel construction favorable to the inward application of successive tire-carrying rims having been disclosed in my U. S. Patent 1,744,915, granted January 28, 1929, it is an object of the present invention, including additional features which are disclosed in my pending application Serial No. 292,281, filed July 12, 1928, to simplify and improve upon the constructions set forth in said patent and to utilize a technique rendered possible by special features disclosed in said application.

Whereas each spoke of the wheels shown in the mentioned patent outwardly terminates in a single rim seat having sufficient breadth to receive two rims, the respective seats being so grooved as to require said rims to be differently oriented during application thereof, it is an object of the present invention to provide each spoke with a plurality of rim seats axially and peripherally spaced apart sufficiently to permit the use of a so-called "hook-on" method of applying an inner rim with a tire thereon,—the two rims being not only interchangeable but oriented in the same manner, except as they may be oppositely faced, during final movements of application thereof to separate sets of rim seats arranged in pairs.

It is an object of the present invention to provide not only a wheel having novel seats and rims, capable of cooperating in the indicated manner during initial steps in the application of the latter, but to provide a special tool adapted to cooperate with said seats and said rims; and this invention aims also to utilize, in a novel method, both a spaced relationship of wheel spokes, as set forth in said patent, and a spaced relationship of rim seats as set forth in said application.

Other objects of the present invention may be best appreciated from the following description of illustrative embodiments thereof, taken in connection with the appended claims and the accompanying drawings, in which:

Fig. 1 is a side elevational view, with parts sectioned substantially to the level indicated by the line 1—1 of Fig. 2, and with tires omitted.

Fig. 2 is a sectional view, taken substantially as indicated by the line 2—2 of Fig. 1.

Fig. 3 is a detail perspective view, on a larger scale, and taken somewhat as implied by the arrows 3 of Figs. 1 and 2, showing a special tool in use.

Fig. 4 is a view comparable with Fig. 3, but taken as indicated by the arrow 4 thereof and showing wheel parts in vertical section.

Fig. 5 is a separate perspective view of the tool which is shown in use in Figs. 3 and 4.

Fig. 6 is a sectional view through said tool,—taken substantially as suggested by the line 6—6 of Fig. 4, but with parts broken away.

The accompanying drawings show a wheel comprising a hub portion 20 as provided with four integral and radially extending spokes 21, each of which outwardly terminates in a pair of flange-like seat portions,—outer seat portions 22 and inner seat portions 23 being provided with substantially cylindrical surfaces for engagement by separate rims and the respective pairs of seat portions being disconnected circumferentially of the wheel.

In the illustrated form, each seat 22 is separate from the corresponding seat 23 of a pair upon the same spoke,—those web portions of each spoke 21 which connect the two seats being slightly cut away radially of the wheel. The hubs and spokes are preferably of hollow cast construction, all integrally joined together and so formed as to provide maximum strength with minimum weight and also to leave, between a seat 22 and a seat 23, an opening or depression exceeding said seat in breadth.

The tire-carrying rims may be interchangeable; and each rim may comprise a base 24 and a marginal flange ring 25,—which may be formed integrally with said base, as shown, or may be an endless ring formed separately therefrom and held against lateral displacement in any suitable way. Instead of forming the opposite sides of the rim as in conventional constructions, and instead of forming it with an enlarged laterally projecting ring-like portion disclosed in the mentioned patent, in the present instance I prefer to form it with an inwardly extending enlarged marginal portion 26 having a transverse diameter less than that of the opening between the seats 22 and 23 and therefore capable of being applied by a hook-on method hereinafter described.

The enlarged marginal portions 26 are intended to be of such strength as to obviate need for use of felloes. The rims comprising the same may be of identical size and construction but oppositely faced, one marginal portion being received on the seats 22 and the other received on the seats 23. Two fastening devices such as screw members 38 may be provided for each seat 22, 23; each screw may extend in a substantially radial direction through a threadless opening 39,— one opening being provided on either side of the corresponding spoke 21; and each screw may be threaded into an opening 40 in the enlarged portion 26 of a rim. The screws 38 may thus serve finally to draw the rims, after the latter have been suitably positioned, radially into contact with their respective sets of seats 22, 23. The inside diameter of the marginal portion 26 may advantageously be substantially the same as the effective diameter of the mentioned seats affording a "press" fit therewith when the rim is circular; and, in the application of the rims to the seats, said rims may or may not be slightly sprung or "chorded" between the spokes 21, to facilitate their application to the wheel in substantially the same manner as the rim described in my mentioned patent; for the present invention contemplates the use of novel means and methods in the bringing of said rims into positions favorable to the use of the screws 38, or their equivalent.

To afford guidance during a final inward movement of each rim in relation to the seats provided therefor, each seat 22 is shown as provided with an outwardly opening slot or groove 42, and each seat 23 may be provided with a similar groove 43,—the grooves 42 and 43 terminating short of the width of the respective seats 22 and 23; and each rim portion 26 may be provided with cooperating guide means such as four inwardly projecting lug members 44, spaced circumferentially of the rim in exact accordance with the uniform spacing of the grooves 42 and 43,—at a quadrant's distance in case the spokes 21 are four in number. The lugs or stop members 44 when provided on the rims, may be identically positioned with respect thereto; the grooves 42 and 43 should be understood to be so terminated that when the respective rims are applied, with lugs 44 reach a limiting position by abutting the ends of said grooves, the respective pairs of cooperative openings 39 and 40 are in alignment; and, as indicated, the present invention contemplates an improved technique in the bringing of the mentioned lugs into the relationship here referred to.

In applying an inner rim to a wheel the following procedure has heretofore been suggested by me: The inner rim being disposed with its seat-engaging portion 26 outward, said rim may be so rotated as to bring the lugs 44 between adjacent seats 22. The rim may then be advanced into proximity with seat 23 and so rotated as to bring its lugs 44 into alignment with slots 43,—enabling the rim to be moved further inward, until the lugs 44 seat against the inner ends of said groove. However, to obviate all necessity for the mentioned rotation of the inner rim after a sliding of the same axially over the seats 22, the mentioned rims and seats may be so proportioned, as shown, as to permit, said rims to be applied by a so-called "hook-on" method,—which takes advantage of the illustrated openings provided at the outer ends of the spokes and between seats 22 and 23. That is to say, it being easiest to rotate a rim relatively to rim seats before it is applied, spokes 21 being preferably brought initially into diagonal positions, a tire-carrying rim intended to occupy the inner position may be so rotated as to bring a pair of its lugs 44 opposite a pair of slots 43; the top of said rim may next be inwardly inclined and "hooked over" a seat or an upper pair of seats 22,—the drop then permitted by the mentioned openings or depressions between the seats 22 and 23 at the ends of the respective spokes being sufficient to enable the flange 25, the base 24, and the seat-engaging marginal portion 26 of a rim initially occupying such a position as that indicated in dotted lines in Fig. 2 to clear the laterally and downwardly-inclined spokes 21 and the rim seat 22 thereon,—in such manner that all four of the lugs 44 may directly enter the corresponding slots 43. Being thus brought into coaxial relationship with the hub 20 the inner rim may then be directly advanced to the indicated limit,—preferably by means of a suitable hand tool. It will be obvious that another rim 24', with its seat-engaging portion 26 disposed oppositely that that of the inner rim 24, may then be directly applied by similar steps; and the tool shown in Figs. 4–6 inclusive may advantageously be employed in connection with either the application or the removal of either an inner rim or an outer rim of the described character.

The special tool referred to is shown as comprising a handle portion 50 terminated suitably to its use for a prying effect and provided with a head having an integral pin 51, an offset yoke or cam jaw member 52 being pivotally carried by said head and transversely spaced from said pin. When it is desired to complete the application of a rim to a wheel to the limit position predetermined by engagement of lugs 44 with the ends of slots 43 or to start the removal of a rim from a wheel, the threaded or other fastening means 38 being so withdrawn as to permit a sliding movement of a seat-engaging marginal or other portion 26 of a rim relatively to cooperating rim seats 22 or 23, the pin 51 of this tool is intended to be inserted into one of the openings 39, providing a threadless surface for engagement therewith, substantially as implied by Figs. 3 and 4,—with the yoke member 52 engaging opposite and substantially flat surfaces of the marginal portion 26 of that rim that is to be manipulated. The handle is then turned upon the pin 51 as a pivot with the result that the yoke member 52 forces the rim axially of the wheel,—by a cam action in which the handle 50 acts as the longer arm of a lever and guidance is afforded by engagement of lugs 44 in slots 43, or by equivalent means.

It will be evident that this invention provides a comparatively light and yet rigid and reliable wheel construction at moderate cost; and that the rims are genuinely interchangeable, inwardly applicable, and easily and reliably located, by the described tool and in view of the described construction properly to receive their respective fastening means; and that the described "hook-on" construction and method may notably expedite the application and removal of even comparatively heavy rims,—without necessitating removal of any hub-including inner organization providing separate sets of seats, or any lifting of a plurality of rims, with tires thereon, at one time.

Although the foregoing description has included details of but one embodiment of the present invention, it should be understood not only that various features of this invention might be independently employed but also that numerous modifications, additional to any suggested herein, might easily be devised by skilled workers, if informed of the foregoing,—all without departure from the scope of the present invention as the latter is indicated above and in the following claims.

What I claim is:

1. In a dual wheel organization, a hub having radially outwardly projecting spokes and circumferentially spaced pairs of rim seats upon the extremities thereof, the seats of each pair having a channel formed therebetween, axially inner and outer rims of substantially the same diameter as the wheel body, the rims having continuous ribs about the inner peripheries thereof engaging the rim seats, means on the ribs engaging means on the seats to lock the rims from rotation upon the seats, the axial and circumferential spacing and proportioning of said seats and said ribs being such as to permit the rib of the axially inner rim to be hooked over a pair of outer seats and the remaining portions of the rim swung axially inwardly over the other outer rim seats into parallelism with the wheel and with the locking means on the rim in circumferential registration with the means on the seats.

2. A dual wheel and rim assembly comprising a wheel having not more than four spokes, pairs of parallel circumferentially spaced, radially outwardly facing rim seats formed upon the ends of the spokes, axially extending grooves formed in the seats, the seats of each pair of seats having a channel formed therebetween, a pair of rims having continuous ribs at the inner peripheries thereof, the ribs being adapted to seat upon the rim seats by press fit and having radially inwardly projecting studs entering the grooves in the rim seats, the proportions and spacing of the rim studs, rim seats and channels being such that certain of the studs and adjacent portions of the rib of the axially inner rim may be hooked into the channels between two of the pairs of rim seats and the other studs and corresponding rib portion upon the rim may be swung axially inwardly into the plane of the channels with the studs in circumferential register with the grooves.

3. A dual wheel and rim assembly comprising a wheel body having not more than four spokes, pairs of parallel circumferentially spaced radially outwardly facing rim seats formed upon the spokes, the seats of each pair of seats having channels formed therebetween, a pair of rims having continuous ribs at the inner peripheries thereof, the ribs being adapted to seat upon the rim seats by press fit, the proportions and spacing of the rim seats and channels being such that portions of the rib of the axially inner rim may be hooked into the channels between two of the pairs of rim seats and the remaining portions of the rib may be swung axially inwardly into the plane of the channels between the rim seats and then advanced axially upon the seats.

4. A dual wheel and rim assembly comprising a wheel body having axially inner and outer spaced rim supporting portions, inboard and outboard rims adapted to be supported by said portions respectively, the effective inner diameters of the rim seat on the inboard rim being smaller than the outer diameter of the outboard rim supporting portion, and means including a relatively deep channel between the rim supporting portions for allowing an arc portion of the inboard rim and seat thereon, to be tilted and hooked over the outer rim supporting portion, then movement of the rim and seat into alignment with the wheel body with the seat aligned with the channel and then movement of the rim to a position of concentricity with the wheel body.

5. A dual wheel and rim assembly comprising a wheel body having axially inner and outer spaced rim supporting portions, inboard and outboard rims adapted to be supported by said portions respectively, the effective inner diameters of the rim seat on the inboard rim being smaller than the outer diameter of the outboard rim supporting portion, and means including a relatively deep channel between the rim supporting portions for allowing an arc portion of the inboard rim and seat thereon, to be tilted and hooked over the outer rim supporting portion, then movement of the rim and seat into alignment with the wheel body with the seat aligned with the channel and then movement of the rim to a position of concentricity with the wheel body, said means also including circumferentially directed spaces in the plane of the outer rim supporting portion and which constitute an interruption thereof.

6. A dual wheel and rim assembly comprising a wheel body having axially inner and outer rim supporting portions, inboard and outboard rims having rib seats adapted to be supported by said portions respectively, the effective inner diameter of the seat on the inboard rim being smaller than the outer diameter of the outer rim supporting portion, so as to prevent movement of the rim past such seat, parallel to the wheel axis, and means for allowing the inboard rim to be mounted on the inner rim supporting portion by first tilting and hooking an arc portion thereof and of the rib seat over the outboard rim supporting portion, and then reverting the rim to the plane of the wheel and to a position of concentricity to the inner rim supporting portion, said means also including circumferentially directed spaces in the plane of the outer rim supporting portion and which constitute an interruption thereof.

7. A dual wheel and rim assembly comprising a wheel body having axially inner and outer spaced rim supporting portions, inboard and outboard rims adapted to be supported by said portions respectively, the effective inner diameters of the rim seat on the inboard rim being smaller than the outer diameter of the outboard rim supporting portion, and means including a relatively deep channel between the rim supporting portions for allowing an arc portion of the inboard rim and seat thereon, to be tilted and hooked over the outer rim supporting portion, then movement of the rim and seat into alignment with the wheel body with the seat aligned with the channel and then movement of the rim to a position of concentricity with the wheel body, said means also including circumferentially directed spaces in the plane of the outer rim supporting portion and which constitute an interruption thereof and which are diametrically opposed.

8. A dual wheel and rim assembly comprising a wheel body having axially inner and outer rim mounting portions, inboard and outboard rims having rib seats adapted to be mounted on said portions respectively, and means for allowing the inboard rim to be mounted on the inner rim mounting portion by first tilting and hooking an arc part thereof and of the rib seat over the wheel body axially inwardly of the outer rim mounting portion, and then reverting the rim to the plane of the wheel and to a position of concentricity to the inner rim mounting portion, said means including circumferentially directed spaces in the wheel body which constitute an interruption thereof.

9. A dual wheel and rim assembly comprising a wheel body having axially and inner rim mounting portions, inboard and outboard rims having rib seats adapted to be mounted on said mounting portions respectively, the smallest effective inner peripheral dimensions of the inboard rim being smaller than the largest peripheral dimension of the outboard rim mounting portion, and means for allowing the inboard rim to be mounted on the inner rim mounting portion by first tilting and hooking an arc portion thereof over the wheel body axially inward of the outer rim mounting portion and then reverting it to the plane of the wheel and into a position of concentricity with the inboard rim mounting portion, said means including circumferentially directed spaces in the plane of the outer rim mounting portion and which constitute an interruption thereof.

EMIL A. NELSON.